United States Patent
Kim et al.

(10) Patent No.: US 7,653,027 B2
(45) Date of Patent: Jan. 26, 2010

(54) METHOD FOR TRANSMITTING AND RECEIVING DATA

(75) Inventors: Ki-Jun Kim, Seoul (KR); Young-Woo Yun, Seoul (KR); Soon-Yil Kwon, Yongin (KR); Young-Jun Kim, Anyang (KR); Chan-Ho Kyung, Anyang (KR); Jong-Hoe An, Anyang (KR); Sang-Gook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 706 days.

(21) Appl. No.: 11/345,855

(22) Filed: Feb. 1, 2006

(65) Prior Publication Data

US 2006/0193351 A1    Aug. 31, 2006

(30) Foreign Application Priority Data

Feb. 2, 2005    (KR) ............. 10-2005-0009670
Jun. 13, 2005   (KR) ............. 10-2005-0050368

(51) Int. Cl.
*H04W 4/00* (2006.01)

(52) U.S. Cl. ............... 370/334; 370/329; 370/332; 370/350; 455/422.1

(58) Field of Classification Search ......... 455/450–453, 455/446, 443–444, 422.1, 424–425, 553.1, 455/502, 509, 524–525, 550.1; 370/310–350
See application file for complete search history.

(56) References Cited

U.S. PATENT DOCUMENTS 5,751,725 A * 5/1998 Chen ................... 714/708
6,711,413 B1 * 3/2004 Heidari ................ 455/515
2003/0013454 A1 * 1/2003 Hunzinger ............ 455/452
2003/0134655 A1 * 7/2003 Chen et al. ........... 455/522
2004/0037245 A1 * 2/2004 Grilli et al. .......... 370/331
2006/0039344 A1 * 2/2006 Khan ................. 370/345
2006/0166673 A1 * 7/2006 Vasudevan ........... 455/522

FOREIGN PATENT DOCUMENTS

| KR | 2004-0062384 A | 7/2004 |
|----|----------------|--------|
| KR | 2004-0088791 A | 10/2004 |
| KR | 2004-0088844 A | 10/2004 |
| WO | 99/08457       | 2/1999 |
| WO | 2006/083121    | 8/2006 |

* cited by examiner

*Primary Examiner*—Kamran Afshar
(74) *Attorney, Agent, or Firm*—Lee, Hong, Degerman, Kang & Waimey

(57) ABSTRACT

In a mobile communications system, a method of transmitting data corresponding to the same logical channel through two or more base stations, comprising: transmitting a first sub-packet generated by a first base station and a second base station based upon an encoded packet; and at a time point after the lapse of a certain time period from when the first sub-packet was transmitted, transmitting a second sub-packet generated by one of the first and second base stations based upon the encoded packet. When data corresponding to the same logical channel is broadcast from each base station that has respectively different channel environments, data transmission efficiency can be improved.

15 Claims, 8 Drawing Sheets

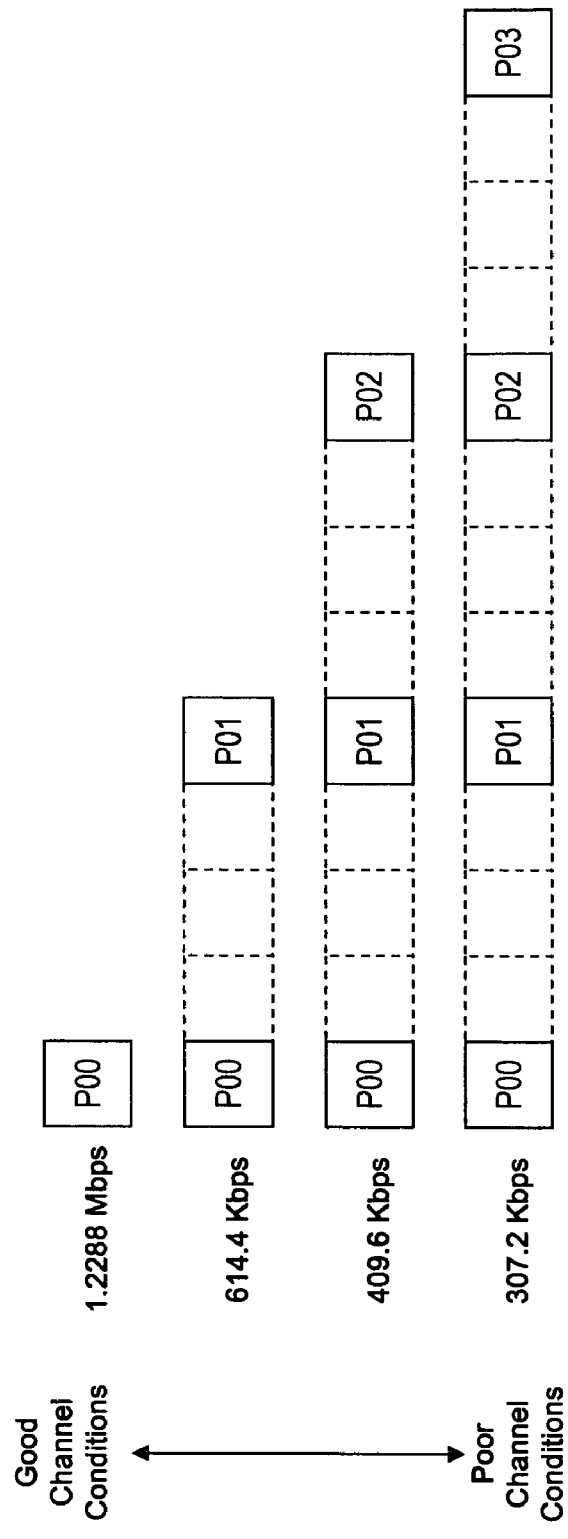
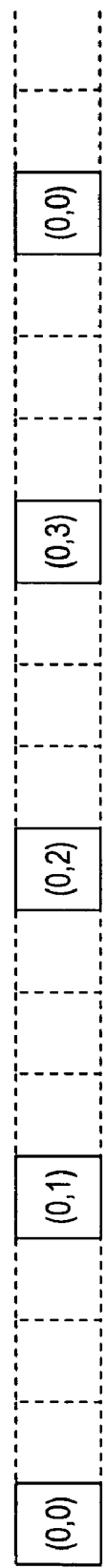

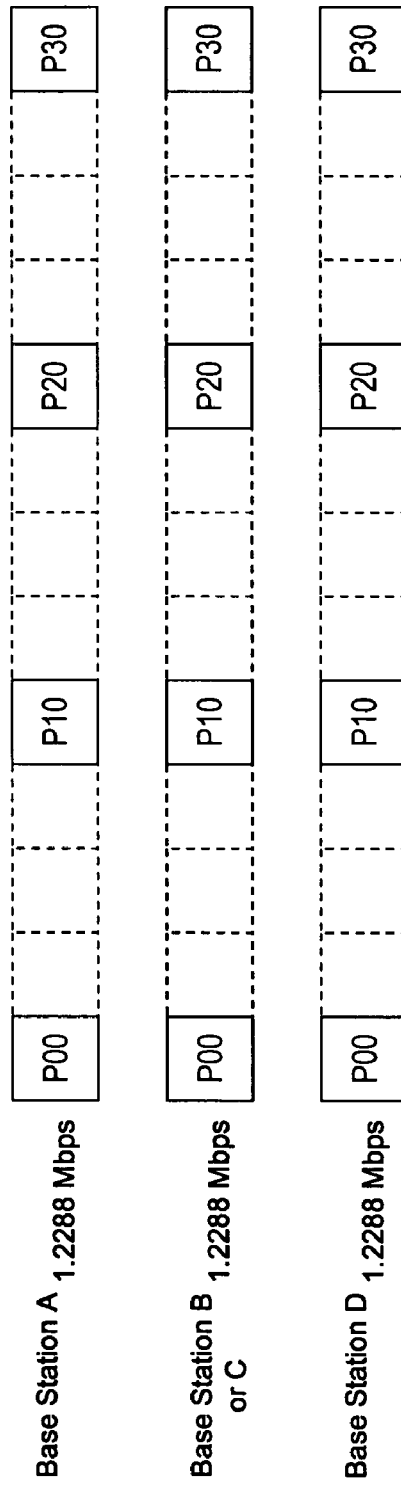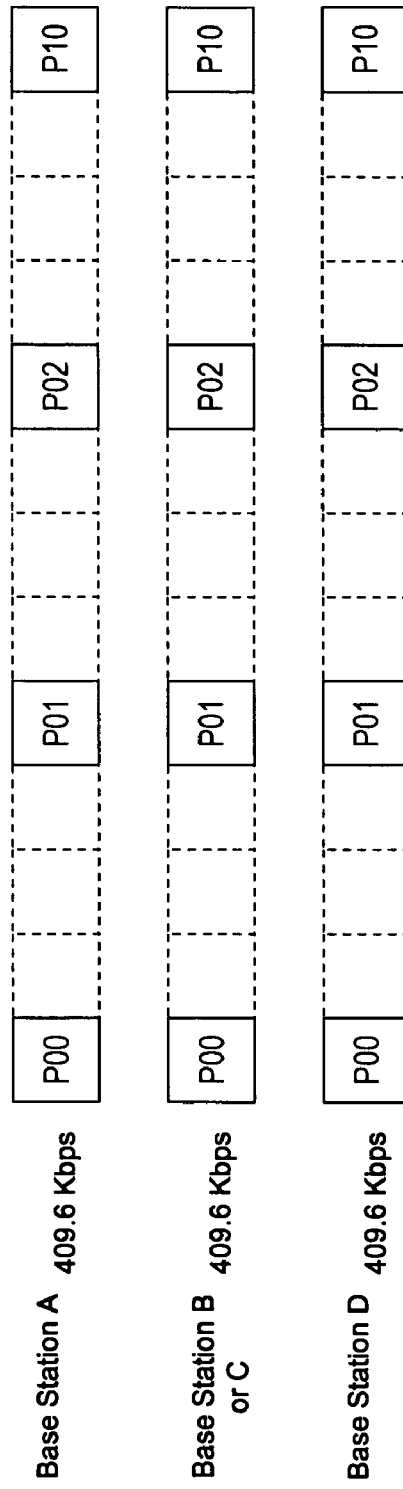

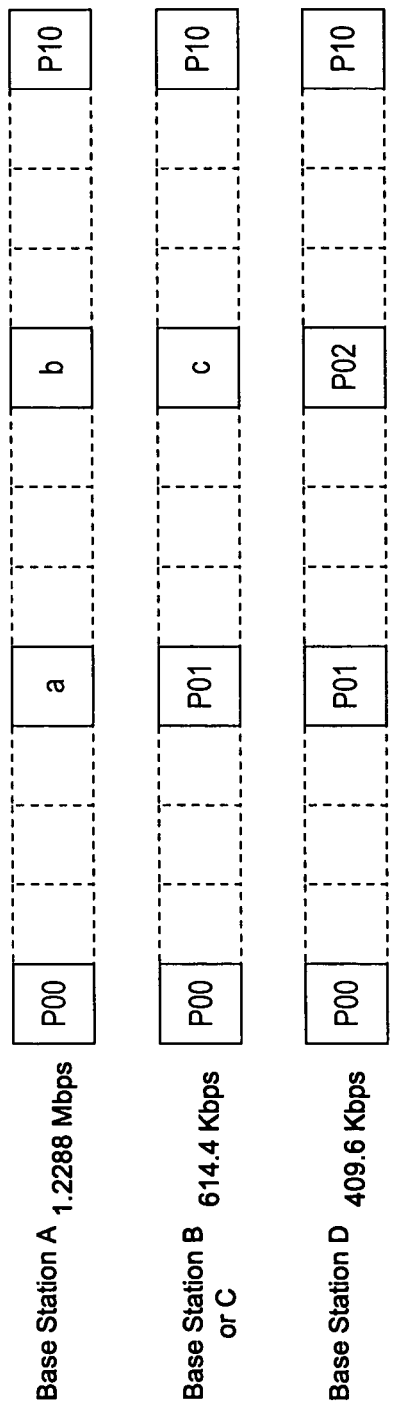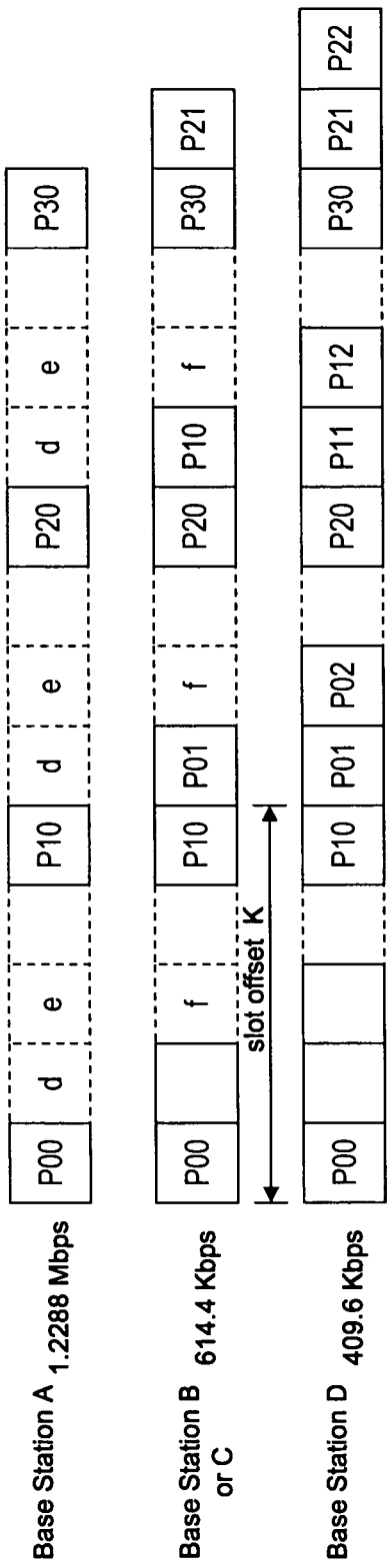

METHOD FOR TRANSMITTING AND RECEIVING DATA

CROSS REFERENCE TO RELATED APPLICATION

Pursuant to 35 U.S.C. § 119(a), this application claims the benefit of earlier filing date and right of priority to Korea Application No. 10-2005-9670, filed Feb. 2, 2005 and Korean Application No. 10-2005-50368, filed on Jun. 13, 2005, the contents of which are hereby incorporated by reference herein in their entirety.

BACKGROUND OF THE INVENTION

1. Field of the Invention

The present invention relates to transmitting and receiving data and, more particularly, to a method for improving data transmission efficiency when data corresponding to the same logical channel is broadcast from each base station that has respectively different channel environments.

2. Background of the Related Art

In a mobile communications system that supports broadcast/multicast services, multimedia data including images need to be transmitted in addition to voice data, thus a high data rate is required. Accordingly, to provide broadcast/multicast services, a packet data channel of the physical layer should be able to support high data rates.

In a wireless environment where fading exists, in order to transmit multimedia data through the packet data channel in a stable manner, the Hybrid Automatic Repeat Request (HARQ) scheme is applied. HARQ combines the techniques of Forward Error Correction (FEC) and Automatic Repeat Request (ARQ).

The HARQ scheme will be explained in more detail as follows. First, for the data to be transmitted, encoding is performed by using a channel coder (e.g., a turbo encoder) having an error correction function, and one or more sub-packets associated with a single packet are transmitted.

When a first sub-packet is transmitted from the transmitting end, decoding is performed at the receiving end that received the first sub-packet. If decoding is successfully performed, an acknowledgement (ACK) signal is sent to the transmitting end. Meanwhile, if decoding of the received first sub-packet is not successful, a negative acknowledgement (NACK) signal is fed back to the transmitting end.

At the transmitting end, if an ACK signal is received, a first sub-packet associated with a subsequent packet is transmitted. If a NACK signal is received, a second sub-packet associated with the packet that was already transmitted is transmitted. At the receiving end, the first sub-packet is stored in a buffer, and when the second sub-packet is transmitted, the first and second sub-packets are combined and decoding is performed such that the success rate of decoding can be increased.

FIG. 1 shows an exemplary method of implementing HARQ to a packet interlace structure. Referring to FIG. 1, the channel used for transmitting packet data can be implemented by using a structure whereby each interlace is regularly repeated with a certain time interval. As shown in FIG. 1, the exemplary packet data channel include four interlaces, thus a single packet is transmitted by employing one of the four interlaces. When the interlace to be transmitted is determined, the corresponding packet is transmitted through the determined interlace. This will be explained in more detail as follows.

In FIG. 1, for the $0^{th}$ packet, the first sub-packet is P00, the second sub-packet is P01, the third sub-packet is P02, and the fourth sub-packet is P03. For the $1^{st}$ packet, the first sub-packet is P10.

As shown in FIG. 1, it is assumed that the $0^{th}$ packet is transmitted by using the $0^{th}$ interlace. From the transmitting end, a first sub-packet associated with the $0^{th}$ packet is transmitted to the receiving end via the $0^{th}$ interlace. Upon receiving and decoding the first sub-packet at the receiving end, if decoding was unsuccessful, a NACK signal is fed back to the transmitting end. At the transmitting end, upon receiving the NACK signal, the $0^{th}$ interlace is used to transmit a second sub-packet associated with the $0^{th}$ packet to the receiving end. Upon receiving the second sub-packet, the receiving end combines the second sub-packet with the first sub-packet that was stored in a buffer and decoding is performed. Despite this, if decoding is still unsuccessful, a NACK signal is fed back to the transmitting end.

At the transmitting end, upon receiving the NACK signal, the $0^{th}$ interlace is used again to transmit a third sub-packet associated with the $0^{th}$ packet to the receiving end. This procedure is repeatedly performed until an ACK signal is received or until a threshold number of times is reached. As above, each sub-packet associated with a single packet is transmitted by using the same interlace.

When transmitting broadcast/multicast data through a packet data channel, the above ACK/NACK feedback does not exist. This is due to the characteristics of one-to-many communications that is characteristic of broadcast/multicast services. Accordingly, when broadcast/multicast data is transmitted, because individual ACK/NACK signals cannot be received with respect to each mobile station, a transport format must be determined such that any mobile station existing in a particular cell has a reception quality that is above a certain threshold. Such transport format comprises a data rate, payload size, the number of transmitted sub-packets, the modulation method to be used, etc. When this transport format has been determined, each base station performs broadcast/multicast services according to the determined transport format.

FIG. 2 shows exemplary types of data rates that can be provided when the number of sub-packets are changed while the payload size and modulation method are fixed. Here, it is assumed that the payload size is 2048 bits, and the sub-packet transmission time interval is 1/600 seconds. As shown in FIG. 2, upon considering the fading environment, the interference environment, cell radius, etc., for a base station having a good overall channel environment (conditions), the $0^{th}$ interlace is used once to transmit a single packet, thus broadcast/multicast packets can be transmitted at a high data rate (e.g., 1.2288 Mbps). However, if the overall channel environment (conditions) is not good, the $0^{th}$ interlace is used 4 times to transmit a single packet, thus broadcast/multicast packets are transmitted at a low data rate (e.g., 307.2 kbps).

The broadcast/multicast data is transmitted via a packet data channel having an interlace structure, and each interlace has at least one multiplex. Preferably, a single interlace includes 4, 8, or 16 multiplexes. Thus, an interlace-multiplex pair is used to indicate which multiplex within which interlace is used to transmit a packet.

For each interlace-multiplex pair, there is a burst length associated thereto. The burst length is determined by multiplying the number of sub-packets per packet according to a transmission data rate by the number of packets to be transmitted per burst. An interlace-multiplex pair consecutively occupies a particular interval of the same interlace that equals a burst length. Accordingly, the packet data channel, through which broadcast/multicast data is transmitted, comprises subchannels defined by interlace-multiplex pairs. The base station maps one logical channel that includes at least one broadcast/multicast service (BCMCS) flow to at least one interlace-multiplex pair.

Table 1 shows an example of an overhead signaling message that includes information related to an interlace-multiplex pair, burst length, and the number of sub-packets per packet.

TABLE 1

| Field | Length (bits) |
|---|---|
| [ . . . ] | |
| Interlace0Included | 1 |
| SameBurstLengths0 | 0 or 1 |
| TotalBurstLength0 | 0 or 10 |
| Zero, one, or MultiplexesPerInterlace-1 occurrences of the following field: | |
| BurstLength0 | 4 |
| Interlace1Included | 1 |
| SameBurstLengths1 | 0 or 1 |
| TotalBurstLength1 | 0 or 10 |
| Zero, one, or MultiplexesPerInterlace-1 occurrences of the following field: | |
| BurstLength1 | 4 |
| Interlace2Included | 1 |
| SameBurstLengths2 | 0 or 1 |
| TotalBurstLength2 | 0 or 10 |
| Zero, one, or MultiplexesPerInterlace-1 occurrences of the following field: | |
| BurstLength2 | 4 |
| Interlace3Included | 1 |
| SameBurstLengths3 | 0 or 1 |
| TotalBurstLength3 | 0 or 10 |
| Zero, one, or MultiplexesPerInterlace-1 occurrences of the following field: | |
| BurstLength3 | 4 |
| [ . . . ] | |
| Zero or one occurrence of the following four fields: | |
| PhysicalChannelCount | 7 |
| DataRate | 0 or 4 |
| OuterCode | 0 or 4 |
| MACPacketsPerECBRow | 0 or 4 |
| Zero or PhysicalChannelCount occurrence of the following two fields; | |
| Interlace | 2 |
| Multiplex | 4 |

In Table 1, the Interlace0Included, Interlace1Included, Interlace2Included, and Interlace3Included fields indicate which interlace is used for the BCMC service. For example, if the $0^{th}$ interlace is used for the BCMCS, the Interlace0Included field corresponding to the $0^{th}$ interlace is set to '1', but can be set to '0' if not used.

The MultiplexesPerInterlace field indicates the number of multiplexes that comprise one interlace.

Also, the BurstLength0, BurstLength1, BurstLength2, and BurstLength3 fields indicate the burst length corresponding to each interlace-multiplex pair, respectively.

Additionally, the PhysicalChannelCount field indicates the number of physical sub-channels, whereby a sub-channel refers to an interlace-multiplex pair used to transmit one BCMCS logical channel.

The DataRate field indicates the data rate of the corresponding physical channel. Here, according to this data rate value, the size of a packet transmitted through the corresponding physical channel and the number of slots needed to transmit one packet are determined.

Table 2 shows an example of data rates according to the DataRate field value of Table 1 and the number of slots needed to transmit the packets transmitted through the corresponding physical channel.

TABLE 2

| DataRatexxx field | Data Rate | Slots per Broadcast Physical Layer packet |
|---|---|---|
| '0000' | 38.4 kbps | 16 |
| '0001' | 76.8 kbps | 8 |
| '0010' | 153.6 kbps | 4 |
| '0011' | 204.8 kbps | 3 |
| '0100' | 307.2 kbps | 2 |
| '0101' | 308.2 kbps | 4 |
| '0110' | 409.6 kbps | 3 |
| '0111' | 614.4 kbps | 1 |
| '1000' | 614.4 kbps | 2 |
| '1001' | 921.6 kbps | 2 |
| '1010' | 12288.8 kbps | 1 |
| '1011' | 12288.8 kbps | 2 |
| '1100' | 1843.2 kbps | 1 |
| '1101' | 2457.6 kbps | 1 |
| '1110' to '1111' | Reserved | |

In Table 1, the interlace field and the multiplex field are used for the purpose of informing about which interlace-multiplex pair the corresponding physical channel is transmitted through. Here, the number of packets associated with one interlace-multiplex pair can be calculated by dividing the burst length by the number of slots associated with one packet.

FIG. 3 shows an exemplary method of transmitting broadcast/multicast data using an interlace-multiplex pair structure. When the interlace-multiplex pair is indicated as (interlace number, multiplex number), broadcast/multicast data is transmitted through the packet data channel as shown in FIG. 3. Here, FIG. 3 shows an example where there are four multiplexes per each interlace, and each multiplex burst length is one.

FIG. 4 shows exemplary zone structures for a broadcast/multicast service. A broadcast/multicast service may be provided through a zone-based manner (Zone A through Zone G). In a zone-based service, a region occupied by at least one base station group is defined as one zone unit, and for each zone unit, a BCMCS flow is provided as a service, independently. Accordingly, the base stations, which are part of the same zone, transmit upon mapping the same logical channel having the same BCMCS flows to the same interlace-multiplex pair.

It should be noted that each zone may be comprised of smaller regions or areas called cells or sectors. Here, a cell may be a region defined on the basis of terrain characteristics, while a sector may be a region defined on the basis of signal characteristics. Also, a base station may manage one or more cells, or one or more sectors. As such, it can be said that a service is provided on a per cell basis, on a per sector basis, on a per base station basis, or the like. The following description will generally refer to zones having cells therein merely for the sake of simplicity.

As above, when performing a zone-based broadcast/multicast service, all base stations within each zone transmit the same data through the same interlace-multiplex pair. Thus, a mobile station located within a particular zone, receives the same packet transmitted from at least one base station within that same zone, and by combining and decoding these, diversity gain may be obtained.

FIG. 5 shows an example for explaining cells having respectively different channel environments within a single zone. Like cell A, for a mobile station in a cell located at a central region of a zone, the same packet being transmitted from neighboring base stations is received, and diversity gain can be obtained. However, like cell B or cell D, for a mobile station in a cell located at an outer periphery of the zone, other packets transmitted from cells that are part of other zones cause interference and the channel state (condition) may thus be no good. Meanwhile, like cell C, although located at a central region of the zone, the channel state (condition) may be poor due to environmental characteristics of the cell itself, due to terrain, buildings, or the like.

Accordingly, in a cell with good channel conditions (such as cell A), packets can be transmitted at a high data rate, such as 1.2288 Mbps. But in locations where the channel conditions are not good (such as cells B, C, or D), to overcome poor channel conditions, redundancy information is added and because such needs to be transmitted multiple times, packets can only be transmitted at 614.4 kbps or at a lower data rate.

FIG. 6 shows an exemplary method of transmitting broadcast/multicast data according to the related art. Referring to FIG. 6, one interlace includes four multiplexes, and the BCMCS logical channel is mapped to four interlace-multiplex pairs (0,0), (0,1), (0,2), (0,3). Namely, a method of transmitting data using the entire $0^{th}$ interlace is shown. Here, the burst length is 1. In the first embodiment, because the burst length is 1, only one sub-packet per one packet is transmitted. Thus, although packets can be transmitted at a high data rate, degraded service quality with respect to a mobile station located in a cell with poor channel conditions is one type of problem that occurs.

FIG. 7 shows another exemplary method of transmitting broadcast/multicast data according to the related art. Referring to FIG. 7, a single interlace includes four multiplexes, and a BCMCS logical channel is mapped to four interlace-multiplex pairs (0,0), (0,1), (0,2), (0,3). Namely, a method of transmitting data using the entire $0^{th}$ interlace is shown. Here, the burst length is 3. In this case, because the burst length is 3, three sub-packets per one packet may be transmitted. Thus, in a zone-based structure, with respect to mobile stations located in a cell with poor channel conditions, service quality may be guaranteed in a more stable manner, but a low data rate is another type of problem that occurs.

As explained above, when providing zone-based broadcast/multicast services, the channel conditions for each cell may be different. However, if the transport format is determined on the basis of a particular cell, a waste of radio (wireless) resources occurs with respect to each cell, which can cause a decrease in efficiency and a decrease in service quality.

SUMMARY OF THE INVENTION

One aspect of the present invention involves the recognition by the present inventors of the drawbacks in the related art, as explained above. Based upon such recognition, improvements to a variable rate transmission method have been made according to the present invention.

More specifically, the present invention provides a point-to-multipoint service method for a communications system having at least one access network and multiple terminals, the method comprising the steps of, configuring the access network such that sectors in the same zone transmitting the same logical channel are allowed to employ different transmit data rates for transmitting data packets, and providing the point-to-multipoint service to respective terminals using the different transmit data rates.

The present invention relates to a packet data transmission method, more particularly, a method of effectively broadcasting packets based upon channel conditions at the base station.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIG. 2 shows exemplary types of data rates that can be provided when the number of sub-packets are changed while the payload size and modulation method are fixed.

FIG. 3 shows an exemplary method of transmitting broadcast/multicast data using an interlace-multiplex pair structure.

FIG. 6 shows an exemplary method of transmitting broadcast/multicast data according to the related art.

FIG. 7 shows another exemplary method of transmitting broadcast/multicast data according to the related art.

FIG. 8 shows an exemplary method of transmitting broadcast/multicast data through a packet data channel according to a first embodiment of the present invention.

FIG. 9 shows an exemplary method of transmitting broadcast/multicast data through a packet data channel according to a second embodiment of the present invention.

DETAILED DESCRIPTION OF THE PREFERRED EMBODIMENTS

Figure 1:
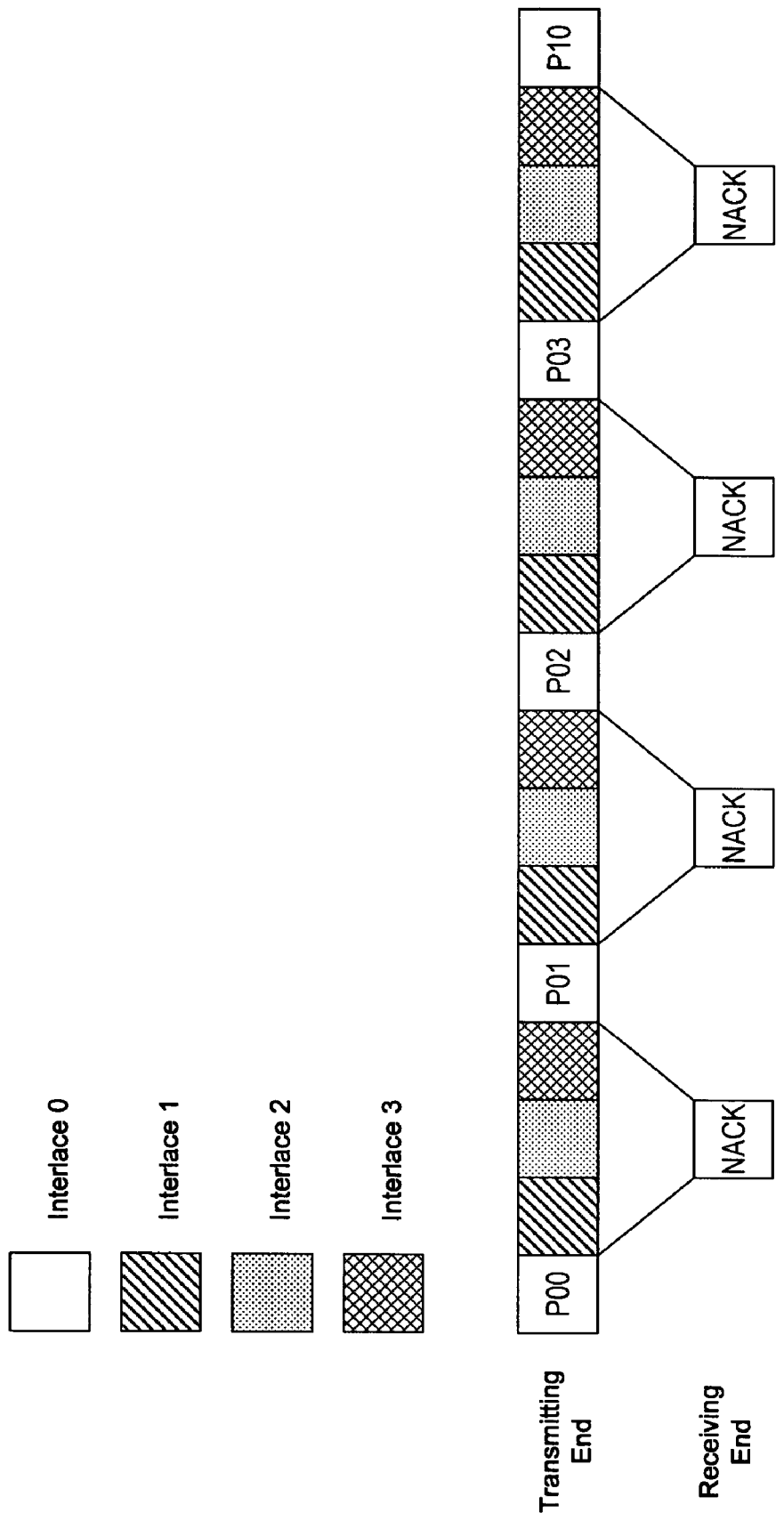
FIG. 1 shows an exemplary method of implementing HARQ to a packet interlace structure.
Figure 4:
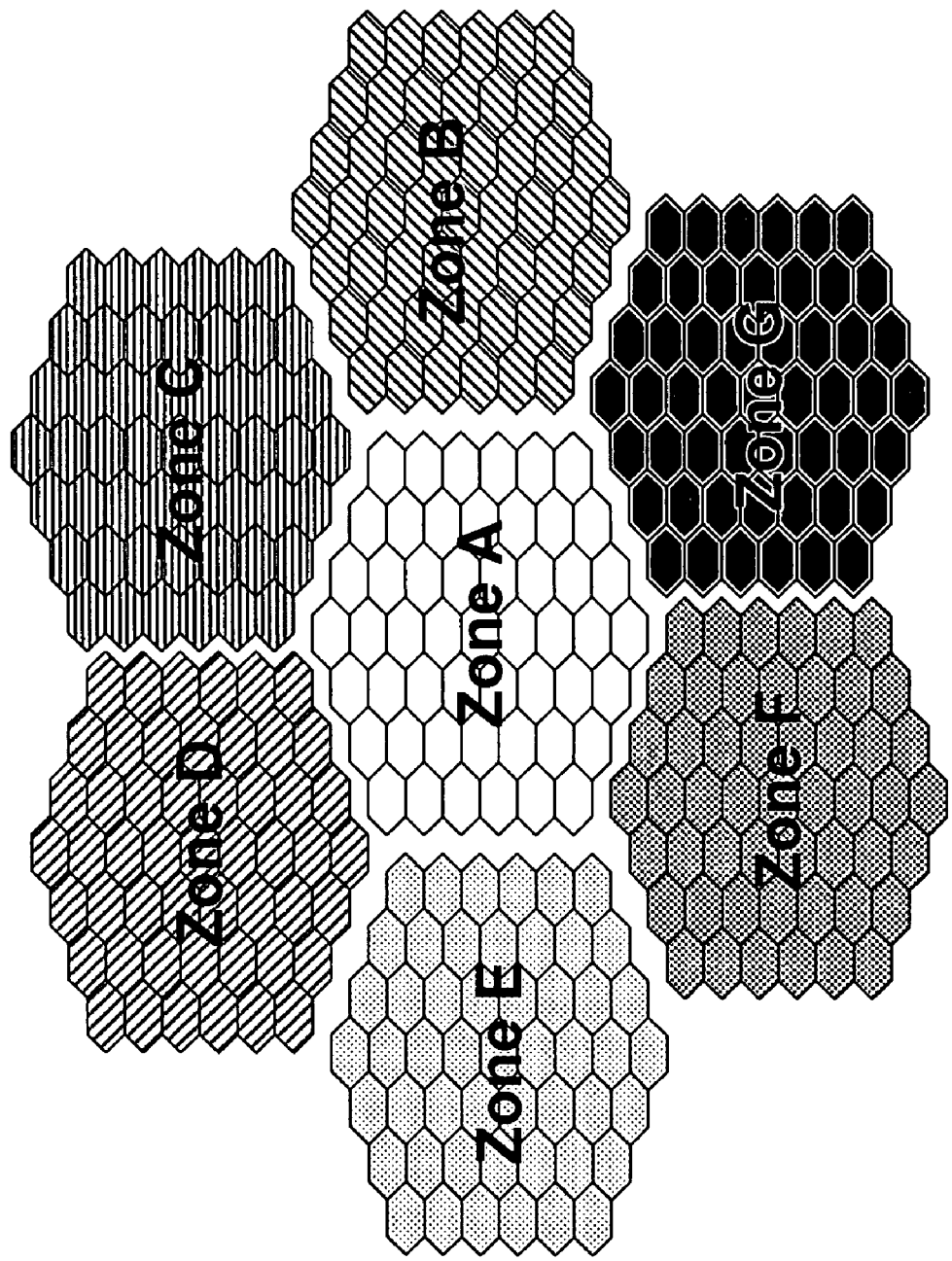
FIG. 4 shows exemplary zone structures for a broadcast/multicast service.
Figure 5:
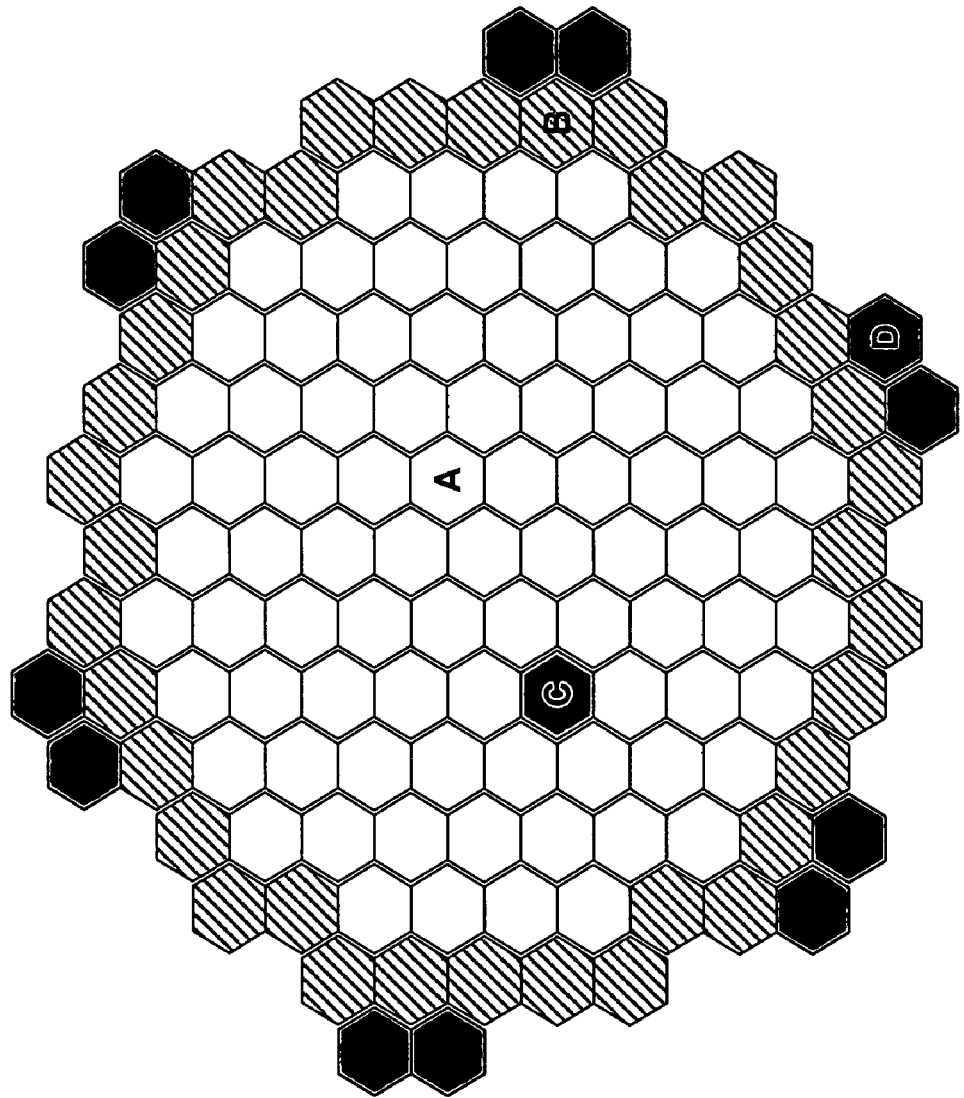
FIG. 5 shows an example for explaining cells having respectively different channel environments within a single zone.

The present invention is described as being implemented in a 3GPP2 type mobile communications system, such as a 1xEV-DO mobile communications system. However, the features of the present invention may also be adapted and implemented in communications systems operating under other types of communication specifications (e.g., 3GPP, 4G, IEEE, OMA, etc.), because the concepts and teachings of the present invention could be applied to various communication schemes that operate in a similar manner based upon common techniques.

Also, the present invention will be explained in the context of broadcast/multicast services (BCMCS), but the features of the present invention may apply to various types of point-to-multipoint services that provide multimedia data to users, such as multimedia broadcast/multicast service (MBMS), media broadcasting, contents delivery, and the like.

Non-limiting exemplary embodiments of the present invention are explained below with reference to the attached Figures.

The present invention provides a data transmission and reception method, whereby if the channel conditions (states) of base stations within the same zone are respectively different, such conditions are considered to transmit (e.g., broadcast) packet data more effectively.

FIG. 8 shows an exemplary method of transmitting broadcast/multicast data through a packet data channel according to a first embodiment of the present invention. In the first embodiment as shown in FIG. 8, a single interlace includes 4 multiplexes, and a BCMCS logical channel is mapped to four interlace-multiplex pairs (0,0), (0,1), (0,2), (0,3). Namely, a method of transmitting data using the entire $0^{th}$ interlace is shown. Here, the burst length is 3.

In this embodiment, even though the burst length has been determined to be 3, according to the channel conditions of each base station, the number of sub-packets associated with a single packet are allowed to be determined independently, respectively.

Namely, assuming that channel conditions at base station A are very good, base station A is set to transmit only a single sub-packet associated with a single packet, such that packets are transmitted at a high data rate.

Also, assuming that channel conditions at base station B or C are fairly good, base station B or C is set to transmit two sub-packets associated with a single packet, such that packets are transmitted at a relatively high data rate.

However, assuming that channel conditions at base station D are poor, base station D is set to transmit three sub-packets associated with a single packet, such that packets are transmitted at a low data rate.

As explained above, at those base stations having good channel conditions, packets are transmitted at a higher data rate to thus increase transmission efficiency, while at those base stations having poor channel conditions, packets are transmitted at a lower data rate to thus guarantee reception quality.

Meanwhile, when channel conditions are good, such as at base station A, different types of data may be transmitted via the time interval when the $2^{nd}$ and $3^{rd}$ sub-packets are transmitted, to thus increase transmission efficiency. Here, when other types of data are transmitted, the transmit power of base station A can be controlled by considering the interference with the data transmitted via the interlace from other base stations. Namely, the transmit powers for the slots that transmit BCMCS data and for the slots that transmit other data can be set differently. The difference or ratio between the transmit power of the slots that transmit BCMCS data and the transmit power of the slots that transmit other data can be sent to the mobile station through signaling.

Table 3 shows an example of an overhead signaling message for supporting a BCMC logical channel transmission method of the first embodiment.

TABLE 3

| Field | Length (bits) |
|---|---|
| [ . . . ] | |
| InterlaceOIncluded | 1 |
| SameBurstLengths0 | 0 or 1 |
| TotalBurstLength0 | 0 or 10 |
| Zero, one, or MultiplexesPerInterlace-1 occurrences of the following field: | |
| BurstLength0 | 4 |
| Interlace1Included | 1 |
| SameBurstLengths1 | 0 or 1 |
| TotalBurstLength1 | 0 or 10 |
| Zero, one, or MultiplexesPerInterlace-1 occurrences of the following field: | |
| BurstLength1 | 4 |
| Interlace2Included | 1 |
| SameBurstLengths2 | 0 or 1 |
| TotalBurstLength2 | 0 or 10 |
| Zero, one, or MultiplexesPerInterlace-1 occurrences of the following field: | |
| BurstLength2 | 4 |
| Interlace3Included | 1 |
| SameBurstLengths3 | 0 or 1 |
| TotalBurstLength3 | 0 or 10 |

TABLE 3-continued

| Field | Length (bits) |
|---|---|
| Zero, one, or MultiplexesPerInterlace-1 occurrences of the following field: | |
| BurstLength3 | 4 |
| [ . . . ] | |
| Zero or one occurrence of the following four fields: | |
| PhysicalChannelCount | 7 |
| DataRate | 0 or 4 |
| OuterCode | 0 or 4 |
| MACPacketsPerECBRow | 0 or 4 |
| Period | 0 or 2 |
| Zero or PhysicalChannelCount occurrence of the following two fields: | |
| Interlace | 2 |
| Multiplex | 4 |

In Table 3, the Interlace0Included, Interlace1Included, Interlace2Included, and Interlace3Included fields indicate whether each interlace is used for the BCMC service. For example, if the $0^{th}$ interlace is used for the BCMCS, the Interlace0Included field is set to '1', but can be set to '0' if not used.

The MultiplexesPerInterlace field indicates the number of multiplexes that comprise one interlace, while the BurstLength0, BurstLength1, BurstLength2, and BurstLength3 fields indicate the burst length corresponding to each interlace-multiplex pair, respectively.

Additionally, the PhysicalChannelCount field indicates the number of physical sub-channels, each being defined by an interlace-multiplex pair used to transmit one BCMCS logical channel, while the DataRate field indicates the data rate of the corresponding physical channel. Here, according to this data rate value, the size of a packet transmitted through the corresponding physical channel and the number of slots needed to transmit one packet are determined.

The interlace and multiplex field indicates through which interlace-multiplex pair the corresponding physical channel is transmitting.

In the first embodiment shown in FIG. 8, considering base station A as an example, a single physical packet is transmitted through a single slot, and the corresponding interlace-multiplex pair has a burst length of 3. For base station A, because there are intervals during which BCMCS is not transmitted, such as 'a' and 'b', the number of broadcast physical packets that go into a single interlace-multiplex pair cannot be derived (calculated) by dividing the burst length by the number of slots corresponding to a single packet.

Accordingly, there is a need to send information to be used for obtaining the number of physical packets that go into the corresponding interlace-multiplex pair. Thus, as shown in Table 3, such information may be transmitted via a Period field that is included in the broadcast overhead message.

If the Period filed value is defined as the period (interval) when a $1^{st}$ sub-packet of the corresponding physical packet is transmitted, the number of physical packets that go into a corresponding interlace-multiplex pair can be derived (calculated) by dividing the corresponding burst length with the Period field value.

In the first embodiment, base station A has a data rate of 1.2288 Mbps and a broadcast physical packet is transmitted via a $1^{st}$ slot. Meanwhile, base station B has a data rate of 614.4 kbps and a broadcast physical packet is transmitted via a $2^{nd}$ slot, and base station D has a data rate of 409.6 kbps and a broadcast physical packet is transmitted via a $3^{rd}$ slot. For all base stations in FIG. 8, the Period filed value is 3.

Table 4 shows an example of an overhead signaling message for supporting a BCMC logical channel transmission method of the first embodiment.

TABLE 4

| Field | Length (bits) |
|---|---|
| [ ... ] | |
| Interlace0Included | 1 |
| SameBurstLengths0 | 0 or 1 |
| TotalBurstLength0 | 0 or 10 |
| Zero, one, or MultiplexesPerInterlace-1 occurrences of the following field: | |
| BurstLength0 | 4 |
| Interlace1Included | 1 |
| SameBurstLengths1 | 0 or 1 |
| TotalBurstLength1 | 0 or 10 |
| Zero, one, or MultiplexesPerInterlace-1 occurrences of the following field: | |
| BurstLength1 | 4 |
| Interlace2Included | 1 |
| SameBurstLengths2 | 0 or 1 |
| TotalBurstLength2 | 0 or 10 |
| Zero, one, or MultiplexesPerInterlace-1 occurrences of the following field: | |
| BurstLength2 | 4 |
| Interlace3Included | 1 |
| SameBurstLengths3 | 0 or 1 |
| TotalBurstLength3 | 0 or 10 |
| Zero, one, or MultiplexesPerInterlace-1 occurrences of the following field: | |
| BurstLength3 | 4 |
| [ ... ] | |
| Zero or one occurrence of the following four fields: | |
| PhysicalChannelCount | 7 |
| DataRate | 0 or 4 |
| OuterCode | 0 or 4 |
| MACPacketsPerECBRow | 0 or 4 |
| Period | 0 or 2 |
| MainSlotLength | 0 or 2 |
| AssistantSlotLength | 0 or 2 |
| Zero or PhysicalChannelCount occurrence of the following two fields: | |
| Interlace | 2 |
| Multiplex | 4 |

In Table 4, the Interlace0Included, Interlace1Included, Interlace2Included, and Interlace3Included fields indicate whether each interlace is used for the BCMC service. For example, if the $0^{th}$ interlace is used for the BCMCS, the Interlace0Included field is set to '1', but can be set to '0' if not used.

The MultiplexesPerInterlace field indicates the number of multiplexes that comprise one interlace, while the BurstLength0, BurstLength1, BurstLength2, and BurstLength3 fields indicate the burst length corresponding to each interlace-multiplex pair, respectively.

The PhysicalChannelCount field indicates the number of physical sub-channels, each being defined by an interlace-multiplex pair used to transmit one BCMCS logical channel, while the PayloadSize field indicates the size of the payload of the corresponding physical channel.

Table 5 shows an example of actual payload sizes corresponding to PayloadSize field values.

TABLE 5

| PayloadSize field | Payload Size |
|---|---|
| 00 | 2048 |
| 01 | 3072 |
| 10 | 4096 |
| 11 | 5120 |

Referring back to Table 4, the Period filed value is defined as the period (interval) when a $1^{st}$ sub-packet of the corresponding physical packet is transmitted. The MainSlotLength field refers to a slot length of a main sub-packet that goes into a single period (interval), while the AssistantSlotLength field refers to a slot length of the remaining assistant sub-packets that go into the single period (interval).

In the embodiment of FIG. 8, the base stations A, B, C, and D have a PayloadSize field value of '00', namely, 2048, and the Period field value is 3. For example, if base stations B, D are adjacent to (near) base station A, then base station A has MainSlotLength=1, AssistantSlotLength=0, base station B has MainSlotLength=1, AssistantSlotLength=1, and base station D has MainSlotLength=1, AssistantSlotLength=2. If base station D is far enough such that it is not effected by base station A, but is effected only by base station B, then base station D has MainSlotLength=2, AssistantSlotLength=1.

FIG. 9 shows an exemplary method of transmitting broadcast/multicast data through a packet data channel according to a second embodiment of the present invention. In the second embodiment as shown in FIG. 9, a single interlace includes 4 multiplexes, and a BCMCS logical channel is mapped to four interlace-multiplex pairs (0,0), (0,1), (0,2), (0,3). Namely, a method of transmitting data using the entire $0^{th}$ interlace is shown. Here, the burst length is 1.

In this embodiment, when base stations with good channel conditions and poor channel conditions co-exist within a single zone, data transmission are performed on the basis of a base station having good channel conditions. Referring to FIG. 9, only a single sub-packet associated with a single packet is transmitted via the $0^{th}$ interlace to not only base station A that has very good channel conditions, but also to base stations B, C that have fairly good channel conditions, and to base station D that has poor channel conditions.

Meanwhile, for base stations B, C that have fairly good channel conditions, one or more interlaces other than the $0^{th}$ interlace are used for transmitting one or more other different sub-packets associated with the single packet. Namely, a $1^{st}$ sub-packet is transmitted through interlace-multiplex pairs (0,0), (0,1), (0,2), (0,3), while a $2^{nd}$ sub-packet is transmitted through interlace-multiplex pairs (1,0), (1,1), (1,2), (1,3). Accordingly, the interlace-multiplex pairs (0,0), (0,1), (0,2), (0,3) constitute a main channel, and the interlace-multiplex pairs (1,0), (1,1), (1,2), (1,3) constitute a supplement channel.

In a similar manner, for base station D that has poor channel conditions, one or more interlaces other than the $0^{th}$ interlace are used for transmitting one or more other different sub-packets associated with the single packet. Here, because the channel conditions for base station D are worse that those for base stations B or C, a greater number of sub-packets associated with the single packet need to be transmitted. Namely, a $1^{st}$ sub-packet is transmitted through interlace-multiplex pairs (0,0), (0,1), (0,2), (0,3), a $2^{nd}$ sub-packet is transmitted through interlace-multiplex pairs (1,0), (1,1), (1,2), (1,3), while a $3^{rd}$ sub-packet is transmitted through interlace-multiplex pairs (2,0), (2,1), (2,2), (2,3). Accordingly, the interlace-multiplex pairs (0,0), (0,1), (0,2), (0,3) constitute a main channel, the interlace-multiplex pairs (1,0), (1,1), (1,2), (1,3) constitute a $1^{st}$ supplement channel, and the interlace-multiplex pairs (2,0), (2,1), (2,2), (2,3) constitute a $2^{nd}$ supplement channel.

As explained above, within the same zone, the same BCMCS logical channel data are initially transmitted from all base stations through the same interlace-multiplex pairs (main channel), and according to channel conditions at each base station, additional interlace-multiplex pairs (supplement channels) can also be used to transmit data. Here, a sub-packet index transmitted through a supplement channel can be established by a sub-packet that is subsequent to a sub-packet transmitted via a main channel or a previous (earlier) supplement channel, or can be received through signaling from the base station during a BCMCS setting procedure.

Meanwhile, regarding the main channel and the supplement channel, the transmission start time points between sub-packets with respect to the same packet can have a difference amounting to a slot offset value K, and information about K can be transmitted from the base station through signaling.

Referring to FIG. 9, the main channel and the supplement channels transmit each sub-packet at a data rate of 1.2288 Mbps, respectively. For base station B or C, the $1^{st}$ sub-packet is transmitted through the main channel, and the $2^{nd}$ sub-packet is transmitted through the $1^{st}$ supplement channel. As shown in FIG. 9, the slot offset is 5, and after each sub-packet P00, P10, P20 associated with respectively different packets are transmitted, additional sub-packets P01, P11, P21 are respectively transmitted at 5 slots after the previous sub-packet transmission time point.

In this embodiment, because the base stations B and C transmit supplement channels in addition to the main channel, the effective data rate of the overall broadcast can be considered as being 614.4 kbps. For base station D, this example shows that $1^{st}$ sub-packet being sent through the main channel, the $2^{nd}$ sub-packet being sent through the $1^{st}$ supplement channel, and the $3^{rd}$ sub-packet being sent through the $2^{nd}$ supplement channel. Here, with the $1^{st}$ supplement channel using a slot offset of 5, and the $2^{nd}$ supplement channel using a slot offset of 6, by transmitting two supplement channels, the effective data rate of the overall broadcast channel can be considered as 409.6 kbps.

As a third embodiment based upon FIG. 8, base stations A, B, and C are adjacent to (near) base station D, and the mobile station is currently located at a boundary region of the base stations. In the slot interval in which P00 is transmitted, because all base stations that perform the BCMC service transmit the same BCMCS logical channel, the mobile station can combine the sub-packets transmitted from each base station and decoding thereof can be performed. However, in the interval where P02 is transmitted, only the sub-packet transmitted from base station D must be decoded.

As a fourth embodiment based upon FIG. 9, a mobile station located in a zone of base station D, the $1^{st}$ sub-packets associated with each packet are received from all base stations, and these can be decoded upon combining thereof. However, for the $2^{nd}$ sub-packets, only the sub-packets transmitted from bases stations B, C, and D are combined and decoding is performed thereon, and for the $3^{rd}$ sub-packets, only the sub-packet transmitted from base station D is used in decoding.

Accordingly, among the slots allocated for transmitting a single BCMCS logical channel, there is a need to transmit to the mobile station, the information related to which slots are used to by neighboring base stations to transmit sub-packets. To do so, when transmitting the BCMCS logical channel, with respect to all base stations that the mobile station receives sub-packets from and performs soft-combining with, the information related to which base station transmitting sub-packets in which slots can be sent through signaling.

In FIG. 9, when base station A transmits data that is different from that of base stations B and C via slot 'd' or 'e', the interference with data transmitted from other base stations via these slots is considered, and the transmit power of base station A can be controlled. Namely, the transmit powers of the slots through which the same BCMCS data are transmitted and of the slots through which other data are transmitted can be different. The difference or ratio between the transmit power of the slots transmitting BCMCS data and the transmit power of the slots transmitting other data may be sent to the mobile station through signaling.

Figure 10:
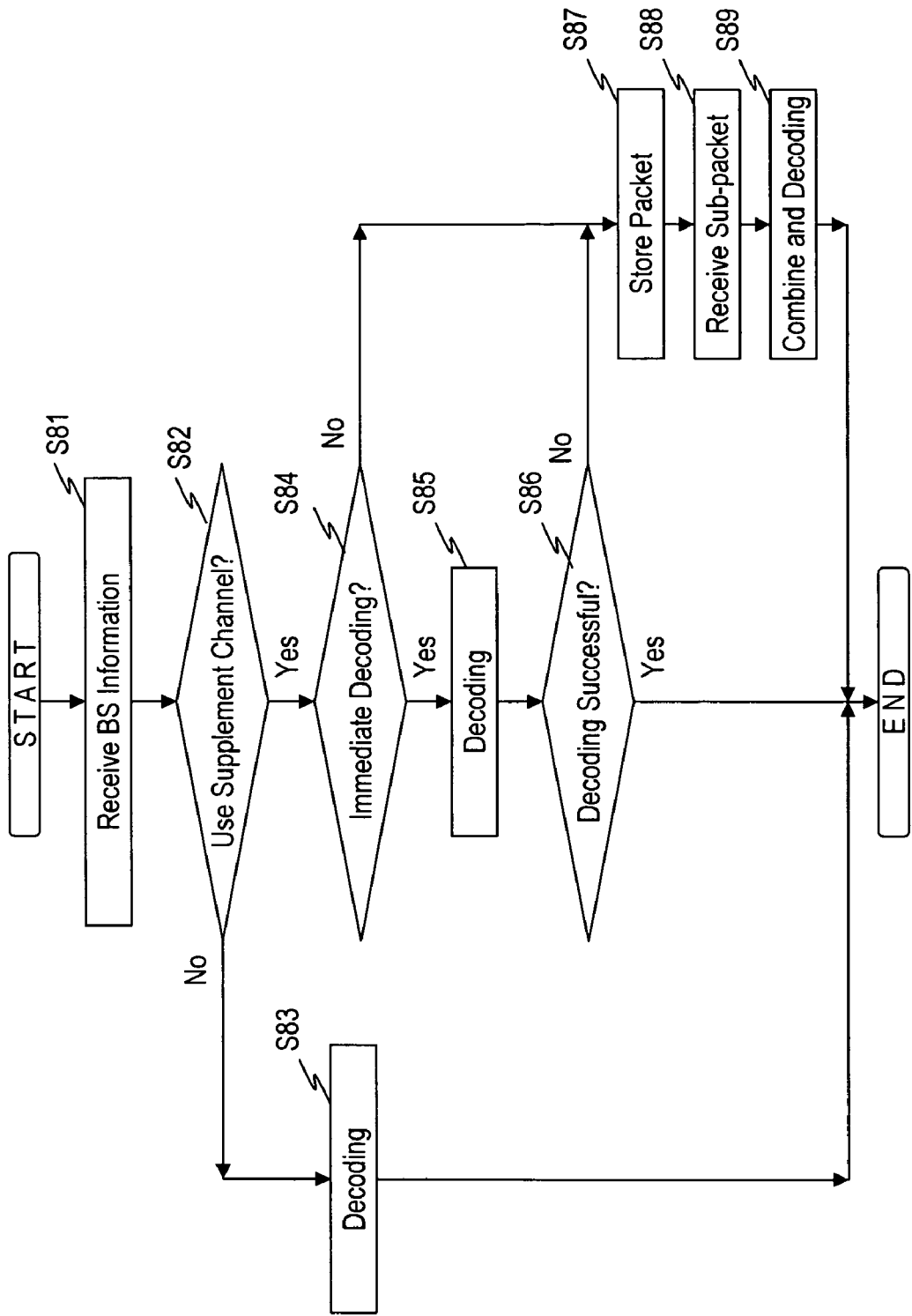
FIG. 10 shows an exemplary flow chart for receiving broadcast/multicast data at a mobile station.

FIG. 10 shows an exemplary flow chart for receiving broadcast/multicast data at a mobile station. The mobile station receives information from the base station about whether it is a base station that uses only a main channel for transmitting data or a base station that additionally uses a supplement channel for transmitting data (S81). Such base station information is checked (S82), and if it is a base station that only uses a main channel for transmitting data, it does not wait for sub-packets transmitted through supplement channels, and the received packet is decoded (S83). For a base station that transmits sub-packets through a main channel together with supplement channels, it is determined whether the received packet should be immediately decoded or whether decoding should be performed after combining sub-packets transmitted through supplement channels upon waiting for a time period that equals a slot offset K (S84).

A base station that uses a main channel together with supplement channels is generally a base station that has poor channel conditions. Accordingly, because there is a high probability of failure when immediately decoding a received packet, there may be a waste of resources for decoding. However, if immediate decoding of a received packet is successful, the procedure of waiting for a sub-packet transmitted through a supplement channel, combining the received sub-packet, and performing decoding thereon can be omitted, thus this may be more efficient. Thus, even though the mobile station is in a zone where the base station transmits data by using a supplement channel, it is determined whether the received packet should be immediately decoded without waiting for a sub-packet transmitted through a supplement channel. If it is determined that the received packet should be immediately decoded, decoding is performed (S85), and then it is checked whether the decoding has been successful (S86). Additionally, combining with the received packet is performed and decoding thereof is carried out (S89). Meanwhile, if it is determined that the received packet should not be immediately decoded, the received packet is stored (S87), and a sub-packet is received through the supplement channel (S88). And then, combining with the received packet is performed and decoding is carried out (S89).

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

Figure 11:
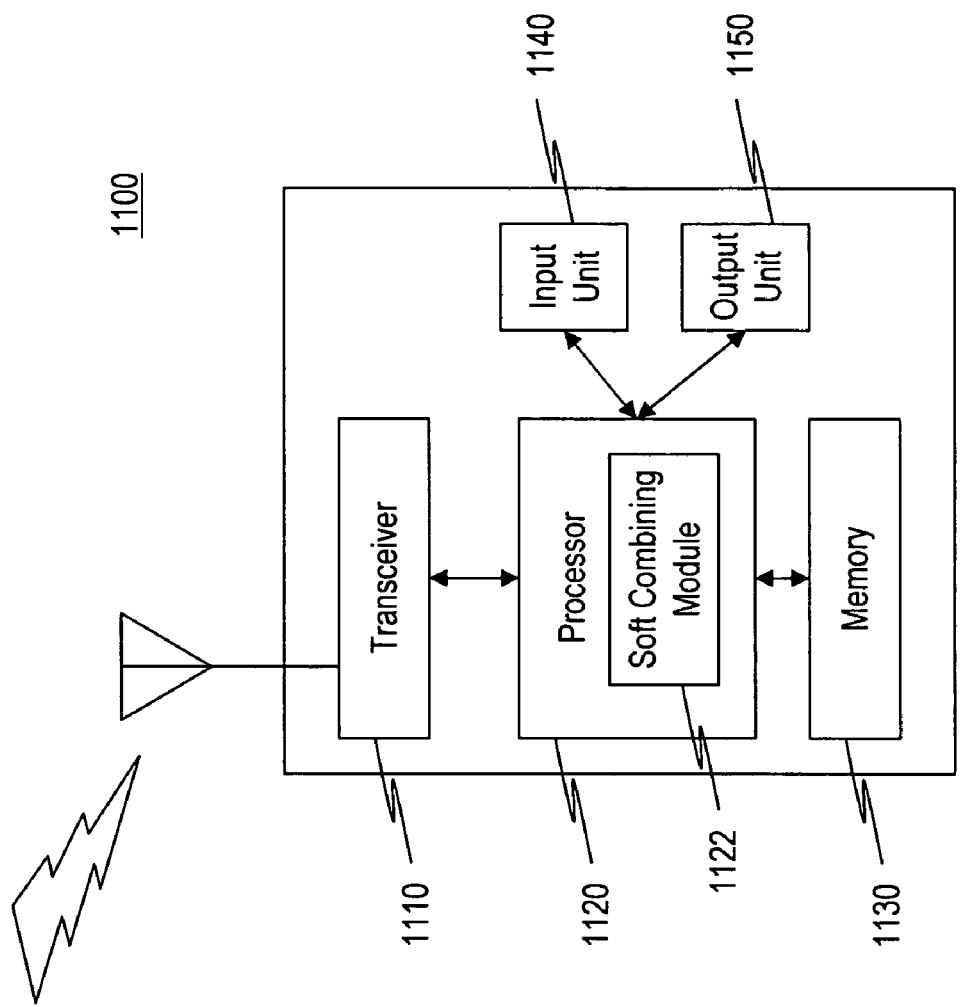
FIG. 11 shows an exemplary structure of a mobile station that supports the features of the present invention.

FIG. 11 shows an exemplary structure of a mobile station that supports the features of the present invention. A mobile station 1100 may be comprised of a transceiver 1110 to transmit and receive signals and data, a memory 1130 to store data therein, and a processor 1120 cooperating with the transceiver 1110 and memory 1130 to handle various required processing procedures. Here, the processor 1120 may include different hardware and/or software components (modules), such as a soft combining module 1122, to support signal processing. An input unit 1140 (e.g., microphone, keypad, function buttons, touch-sensitive input device, etc. to allow audible, visual, and/or tactile inputs) and an output unit 1150 (e.g., speaker, display unit, touch-screen, vibration unit, etc.

to provide audible, visual, and/or tactile outputs) are also part of the mobile terminal 1100 of the present invention.

The present invention provides a point-to-multipoint service method for a communications system having at least one access network and multiple terminals, the method comprising: configuring the access network such that sectors in the same zone transmitting the same logical channel are allowed to employ different transmit data rates for transmitting data packets; and providing the point-to-multipoint service to respective terminals using the different transmit data rates.

Here, the configuring step may comprise employing transmission formats associated with the different transmit data rates, wherein the transmission formats are rate-compatible with one another. The different transmit data rates may be based upon respective channel conditions of each sector. The access network may comprise one or more base stations related to each sector. Each sector may be related to a base station or a cell.

The providing step may comprise transmitting packets using a transmission format with slots, wherein a transmission time of a first slot of each packet are synchronized across all sectors that transmit the same logical channel. One sector may employ a transmission format with a span of one slot, while other sectors employ a rate compatible transmission format with a span of three slots. One sector may employ a transmission format with a span having a first number of slots, while other sectors employ a rate compatible transmission format with a span having a second number of slots. The first and second numbers of slots may be the same or may be different.

The providing step may comprise sending a broadcast overhead message that specifies a transmission format used by a representative sector. The transmission format may employ a field used to indicate a period, wherein the period refers to the number of slots between successive transmissions of packets on a given interlace-multiplex pair. A value of the field may be greater than or equal to the span of the transmission format. At least one remaining slot of a period associated with the one sector may be employed for unicast transmission.

The configuring step may comprise independently assigning a variable transmit data rate to one or more base stations of the adjacent sectors according to channel conditions of each base station.

Also, the present invention provides a point-to-multipoint service method for a communications system having at least one access network and multiple terminals, the method comprising: configuring the access network such that sectors of the same zone form a certain number of sub-packets associated with a single packet; and transmitting from each sector, the certain number of sub-packets which are associated with the single packet, wherein the certain number of sub-packets are independently determined by each sector.

The sub-packets may be transmitted at a constant interval. If one sector transmits less than a maximum number of sub-packets during a given time interval, one or more sub-packets unrelated to the single packet are transmitted by the one sector. The maximum number is based upon a transmission capability of a worst sector. The one sector transmits less than the maximum number of sub-packets means that the one sector transmits less number of sub-packets than at least one different sector. The unrelated sub-packets are transmitted during the given time interval upon being scheduled in the slots where additional sub-packets related to the single packet would have been scheduled. The unrelated sub-packets replace additional sub-packets of the single packet that would have been transmitted during the given time interval.

The configuring step may employ transmission formats associated with the different transmit data rates, wherein the transmission formats are rate-compatible with one another, and the different transmit data rates are based upon respective channel conditions of each sector.

The transmitting step may employ a transmission format with slots, wherein a transmission time of a first slot of each packet are synchronized across all sectors that transmit the same logical channel. One sector employs a transmission format with a span of one slot, while other sectors employ a rate compatible transmission format with a span of three slots. The transmission format may employ a field used to indicate a period, wherein the period refers to the number of slots between successive transmissions of packets on a given interlace-multiplex pair. A value of the field may be greater than or equal to the span of the transmission format. The number of sub-packets transmitted from at least two different sectors are different or are the same.

Additionally, the present invention provides a terminal supporting a point-to-multipoint service and communicating with an access network, the terminal comprising: a transceiver to receive from one or more cells, a certain number of sub-packets associated with one particular packet, whereby the same sub-packet is received from two or more cells if necessary, each cell transmitting one or more sub-packets during a certain time period; and a processor cooperating with the transceiver to perform soft combining of the same sub-packets received from two or more cells via the transceiver.

The certain number of sub-packets associated with the one particular packet were made by the access network that was configured such that cells of the same zone make the certain number of sub-packets, wherein the certain number of sub-packets were independently determined by each cell. Among the cells that transmit the sub-packets, a worst cell having the most poor channel conditions transmits multiple sub-packets during the certain time period. The cells other than the worst cell are allowed to transmit data unrelated to the one particular packet during the certain time period while the worst cell transmits its multiple sub-packets. The data is received in a unicast manner and is related to FTP downloading.

Also, the cells are associated with base stations, and the transceiver and processor further cooperate such that, the transceiver receives one or more initial sub-packets related to a single packet from a initial number of base stations associated with soft combining, and receives one or more additional sub-packets related to the single packet from an additional number of base stations associated with soft combining; and the processor decodes the sub-packets received from the base stations upon performing soft combining thereon, wherein the initial number of base stations and the additional number of base stations are flexibly adjusted by the processor based upon respective channel conditions.

The transceiver and processor further cooperate to receive, from a serving base station, a broadcast overhead message that includes information about how many sub-packets are transmitted from each of the base stations associated with soft combining.

The present invention further provides a method of receiving a point-to-multipoint service by a terminal in communication with multiple base stations including a serving base station and neighbor base stations, the method comprising: receiving one or more first sub-packets related to a single packet from a first number of base stations associated with soft combining; receiving one or more second sub-packets related to the single packet from a second number of base stations associated with soft combining; and decoding the sub-packets received from the base stations upon performing soft combining thereto, wherein the first number of base stations and the second number of base stations are variable based upon channel conditions of the corresponding base stations.

The method may further comprise a step of: receiving one or more $n^{th}$ sub-packets related to the single packet from an n-number of base stations associated with soft combining, wherein the first, the second, and the n-number of base stations are variable based upon channel conditions of the corresponding base stations. The method may further comprise, prior to the receiving steps: receiving, from the serving base station, a broadcast overhead message that includes information about how many sub-packets are transmitted from each of the base stations associated with soft combining. The method may further comprise: preparing to receive unicast data transmitted from the serving base station through any remaining slots, if the serving base station sends a smaller number of sub-packets than other neighbor base stations.

As described thus far, those skilled in the art related to the field of the present invention would understand that various substitutions, modifications, and changes are possible within the technical scope of the present invention, without being limited to the exemplary embodiments and attached Figures described herein.

As for some desirable results and effects of the present invention, data transmission efficiency can be improved when data corresponding to the same logical channel are transmitted (e.g., broadcast) from each base station having respectively different channel conditions (environments).

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

What is claimed is:

1. A point-to-multipoint service method for a communications system having at least one access network and multiple terminals, the method comprising:
    configuring the access network such that sectors in the same zone transmitting the same logical channel are allowed to employ different transmit data rates for transmitting data packets; and
    providing the point-to-multipoint service to respective terminals using the different transmit data rates,
    wherein the configuring step comprises employing transmission formats associated with the different transmit data rates, wherein the transmission formats are rate-compatible with one another, and
    wherein the providing step comprises transmitting packets using a transmission format with slots, wherein a transmission time of a first slot of each packet are synchronized across all sectors that transmit the same logical channel.

2. The method of claim 1, wherein the different transmit data rates are based upon respective channel conditions of each sector.

3. The method of claim 1, wherein the access network comprises one or more base stations related to each sector.

4. The method of claim 1, wherein each sector is related to a base station or a cell.

5. The method of claim 1, wherein one sector employs a transmission format with a span of one slot, while other sectors employ a rate compatible transmission format with a span of three slots.

6. The method of claim 1, wherein one sector employs a transmission format with a span having a first number of slots, while other sectors employ a rate compatible transmission format with a span having a second number of slots.

7. The method of claim 6, wherein the first and second numbers of slots may be the same or may be different.

8. A point-to-multipoint service method for a communications system having at least one access network and multiple terminals, the method comprising:
    configuring the access network such that sectors in the same zone transmitting the same logical channel are allowed to employ different transmit data rates for transmitting data packets; and
    providing the point-to-multipoint service to respective terminals using the different transmit data rates,
    wherein the providing step comprises sending a broadcast overhead message that specifies a transmission format used by a representative sector, and
    wherein the transmission format employs a field used to indicate a period, wherein the period refers to the number of slots between successive transmissions of packets on a given interlace-multiplex pair.

9. The method of claim 8, wherein a value of the field is greater than or equal to the span of the transmission format.

10. The method of claim 8, wherein at least one remaining slot of a period associated with the one sector is employed for unicast transmission.

11. A point-to-multipoint service method for a communications system having at least one access network and multiple terminals, the method comprising:
    configuring the access network such that sectors in the same zone transmitting the same logical channel are allowed to employ different transmit data rates for transmitting data packets; and
    providing the point-to-multipoint service to respective terminals using the different transmit data rates,
    wherein the configuring step comprises independently assigning a variable transmit data rate to one or more base stations of the adjacent sectors according to channel conditions of each base station.

12. A method of receiving a point-to-multipoint service by a terminal in communication with multiple base stations including a serving base station and neighbor base stations, the method comprising:
    receiving one or more first sub-packets related to a single packet from a first number of base stations associated with soft combining;
    receiving one or more second sub-packets related to the single packet from a second number of base stations associated with soft combining; and
    decoding the sub-packets received from the base stations upon performing soft combining thereto,
    wherein the first number of base stations and the second number of base stations are variable based upon channel conditions of the corresponding base stations.

13. The method of claim 12, further comprising a step of:
    receiving one or more nth sub-packets related to the single packet from an n-number of base stations associated with soft combining, wherein the first, the second, and the n-number of base stations am variable based upon channel conditions of the corresponding base stations.

14. The method claim 12, further comprising, prior to the receiving steps:
   receiving, from the serving base station, a broadcast overhead message that includes information about how many sub-packets are transmitted from each of the base stations associated with soft combining.

15. The method claim 14, further comprising:
   preparing to receive unicast data transmitted from the serving base station through any remaining slots, if the sewing base station sends a smaller number of sub-packets than other neighbor base stations.

* * * * *